US006624610B1

(12) United States Patent
Ono et al.

(10) Patent No.: US 6,624,610 B1
(45) Date of Patent: Sep. 23, 2003

(54) ELECTRIC VEHICLE

(75) Inventors: Masao Ono, Kanagawa (JP); Shigemi Kikuchi, Kanagawa (JP)

(73) Assignee: Tokyo R & D Co., Ltd., Tokyo (JP)

( * ) Notice: Subject to any disclaimer, the term of this patent is extended or adjusted under 35 U.S.C. 154(b) by 0 days.

(21) Appl. No.: 09/913,962

(22) PCT Filed: Feb. 28, 2000

(86) PCT No.: PCT/JP00/01151

§ 371 (c)(1),
(2), (4) Date: Aug. 21, 2001

(87) PCT Pub. No.: WO00/51878

PCT Pub. Date: Sep. 8, 2000

(30) Foreign Application Priority Data

Mar. 1, 1999 (JP) .......................................... 11-052987

(51) Int. Cl.⁷ .................................................. H02J 7/00
(52) U.S. Cl. ..................................................... 320/104
(58) Field of Search ........................ 320/104; 180/220, 180/274, 2.2, 211, 222

(56) References Cited

U.S. PATENT DOCUMENTS 5,316,096 A * 5/1994 Good .......................... 180/19.1
5,613,569 A * 3/1997 Sugioka et al. ............. 180/68.5
6,283,238 B1 * 9/2001 Royer et al. ................ 180/19.1

* cited by examiner

Primary Examiner—Edward H. Tso
Assistant Examiner—Pia Tibbits
(74) Attorney, Agent, or Firm—Kanesaka & Takeuchi

(57) ABSTRACT

An electric motor cycle 1 carrying batteries (12) wherein the batteries (12) and a charger (13) are integrated into one body, and the integrated body of batteries and charger is removably mounted on a vehicle body (2). The batteries (12) and the charger (13) are further integrated with a remaining capacity meter (14) into one body, and the integrated body of batteries, charger and remaining capacity meter is removably mounted on the vehicle body. And, a battery-monitoring CPU for protecting the batteries (12) serves to control the charger. A signal line from the remaining capacity meter (14) and a signal line provided on the vehicle body are connected via a connector, and a display of the remaining capacity meter is provided near a speed meter display.

6 Claims, 12 Drawing Sheets

ELECTRIC VEHICLE

TECHNICAL FIELD

The present invention relates to an electric motor cycle capable of changing batteries with ease.

BACKGROUND ART

It is well known that the motor of the electric motor cycle is driven by an on-board battery. It is necessary to recharge the battery because its capacity decreases in proportion to running of the electric motor cycle. The battery mounted on the electric motor cycle can be sometimes recharged as it is on the vehicle, but it is often required to remove the battery from the electric motor cycle to recharge it.

Conventionally, a plurality of batteries are mounted as a unit on the electric motor cycle, and the battery power unit is removed from the vehicle and conveyed to a location where a power supply is available to recharge it.

A charger is generally provided together with the power supply independent of the battery power unit. And, there is not any problem when the battery power unit is always recharged at the same place, but if it is recharged at different places, it is necessary to provide the charger as required.

Particularly, when a resident of a high-rise apartment building or anyone having a parking lot away from a recharging station carries the battery power unit to recharge it, it is desired that recharging can be made easily.

Accordingly, the present invention is to provide an electric motor cycle which allows its batteries to be, recharged readily while the batteries are in a state of mounted on the vehicle and also recharged after removing them from the vehicle.

The invention also proposes several embodiments convenient for recharging the batteries removed from the vehicle.

SUMMARY OF THE INVENTION

According to one aspect of the invention, there is provided a battery-mounted electric motor cycle, wherein batteries and a charger are integrated into one body, and the integrated body of batteries and charger is removably mounted on the vehicle body.

It is convenient that the batteries are recharged without having a separate charger because the batteries are integral with the charger. Whether the batteries are mounted on the vehicle body or removed from the vehicle body, recharging is made easily because the batteries are provided with the charger.

According to another aspect of the invention, the batteries and the charger are further integrated with a remaining capacity meter into one body, and the integrated body of batteries, charger and remaining capacity meter is removably mounted on the vehicle body.

The remaining capacity meter measures the remained electric capacity of the batteries and since it is integrated with the batteries, electric wiring is shortened to save a space for the devices. And, the same effect as described above is provided because the charger is also integrated.

According to still another aspect of the invention, a CPU for monitoring the batteries to protect them also serves as a CPU for controlling the charger.

By configuring as described above, only one CPU, instead of two, is used for space saving and cost reduction.

According to yet another aspect of the invention, a signal line from the remaining capacity meter and a signal line arranged on the vehicle body are connected via a connector, and a display of the remaining capacity meter is provided near a speed meter display.

By configuring as described above, the remaining capacity of the batteries can be checked while the vehicle is running, so that it is possible to deal with before the batteries are dead. Accordingly, a dangerous situation that the batteries are dead while the vehicle is running can be prevented as much as possible.

According to one aspect of the invention, the signal line connector and an electric power connector are integrated so to enable to connect the signal line connector by connecting the electric power connector.

By configuring as described above, both the connectors can be connected simultaneously without connecting independently. Thus, it is convenient to reduce time and effort required for the connection.

According to another aspect of the invention, the batteries are arranged on both sides of the charger.

Thus, the charger can recharge its neighboring batteries. It is also desirable in view of the weight balance because the relatively heavy batteries are disposed on both sides of the charger.

According to still another aspect of the invention, the battery power unit is rotatably mounded on a structure material of the vehicle body.

Since the battery power unit is installed rotatably on the structure material, it can be removed or mounted readily because its posture can be changed to have an appropriate rotation angle for removal or mounting.

According to yet another aspect of the invention, a cover is arranged on the top of the battery power unit and forms the step of a scooter.

Thus, the top cover of the battery power unit forms the step of the scooter so to serve as the cover and the step, thereby enabling to save the number of members. And, the vehicle can be light-weighted because the number of members can be decreased.

According to one aspect of the invention, a battery fixing member is rotatably mounted on the structure material, and the battery power unit is fitted to the battery fixing member to rotatably mount the battery power unit on the structure material.

When the battery fixing member is rotatably mounted on the structure material, the battery power unit is not required to have a rotating mechanism against the structure material. Therefore, the structure of the battery power unit can be simplified, so that the battery power unit to be removed from the vehicle can be light-weighted, and its transportation and handling can be facilitated. Since the battery power unit is rotatable when it is mounted on the battery fixing member, the posture of the battery power unit can be made to have an appropriate rotating angle when it is mounted or removed as described above. Thus, the battery power unit can be removed or mounted with ease.

According to one aspect of the invention, the battery fixing member forms a bottom cover of the battery power unit.

Since the battery fixing member forms the bottom cover of the battery power unit, the battery power unit is protected from mud, water, etc. which are splashed by, for example, a tire, thereby avoiding the batteries from being damaged by an external factor so to prevent the batteries from being degraded or lowered in their service lives.

According to another aspect of the invention, the structure material is disposed near the center line of the vehicle body, the battery power unit rotatably mounted on the structure material is removable from either side of the vehicle body, and a distance between a rotation center of the battery power unit and its side is larger than a distance from the rotation center of the battery power unit to the ground.

It is convenient that the battery power unit can be mounted or removed in a narrow place because the battery power unit is mounted or removable from either side of the vehicle. And, the distance from the rotation center to the side of the battery power unit is made larger than the distance from the rotation center of the battery power unit to the ground, so that the mounting and removal of the battery power unit can be facilitated because the side of the battery power unit is brought into contact with the ground by rotating the battery power unit in either of right and left directions.

According to still another aspect of the invention, the battery power unit is provided with a wheel at its either end.

Since the wheel is provided at the end of the battery power unit, it is convenient to carry the battery power unit. Particularly, when the battery power unit is rotated to have its end brought into contact with the ground as described above, the wheel at the end of the unit is smoothly brought into contact with the ground, so that the battery power unit can be carried easier.

According to yet another aspect of the invention, the wheel is mounted retractably.

Since the wheel is retractably mounted, the mounting of the battery power unit on the vehicle is not hindered by the wheel because it is retracted, and when the batteries are to be recharged, the battery power unit is removed from the vehicle and the wheel is protruded, so that the battery power unit can be carried with ease as described above.

According to one aspect of the invention, the battery power unit is provided with a retractable handle.

By means of the retractable handle, the battery power unit is conveniently carried by pulling out the handle to remove the battery power unit from the vehicle, and the mounting of the battery power unit on the vehicle is not hindered by the handle because it is retracted.

According to another aspect of the invention, the handle is mounted to be pulled out from either side of the battery power unit.

The battery power unit is conveniently carried as described above by pulling out the handle from either side as required according to the side from which the battery power unit is removed.

According to still another aspect of the invention, the battery power unit is provided with a locking mechanism with respect to the vehicle body, which operates to engage or disengage when the handle is retracted or pulled out.

Since the locking mechanism to the vehicle body is provided on the battery power unit, the battery power unit can be firmly fixed to the vehicle body while the vehicle is running to prevent the removable battery power unit from accidentally being removed from the vehicle body. And, the locking mechanism operates to lock or release when the handle is retracted or pulled out, so that it is convenient that the operation of the locking mechanism is simplified.

According to yet another aspect of the invention, electric power and signal lines are connected with or disconnected from the battery power unit when the top cover is closed or opened.

By configuring as described above, it is convenient for reducing time and effort involved in connecting because the connection or disconnection can be effected by closing or opening the top cover without separately connecting or disconnecting the power and signal lines.

BRIEF DESCRIPTION OF THE DRAWINGS

[FIG. 8] (2) A sectional view of the battery power unit taken along line D—D of (1).

BEST MODE FOR CARRYING OUT THE INVENTION

Embodiments of the present invention will be described with reference to the accompanying drawings.

Figure 1:
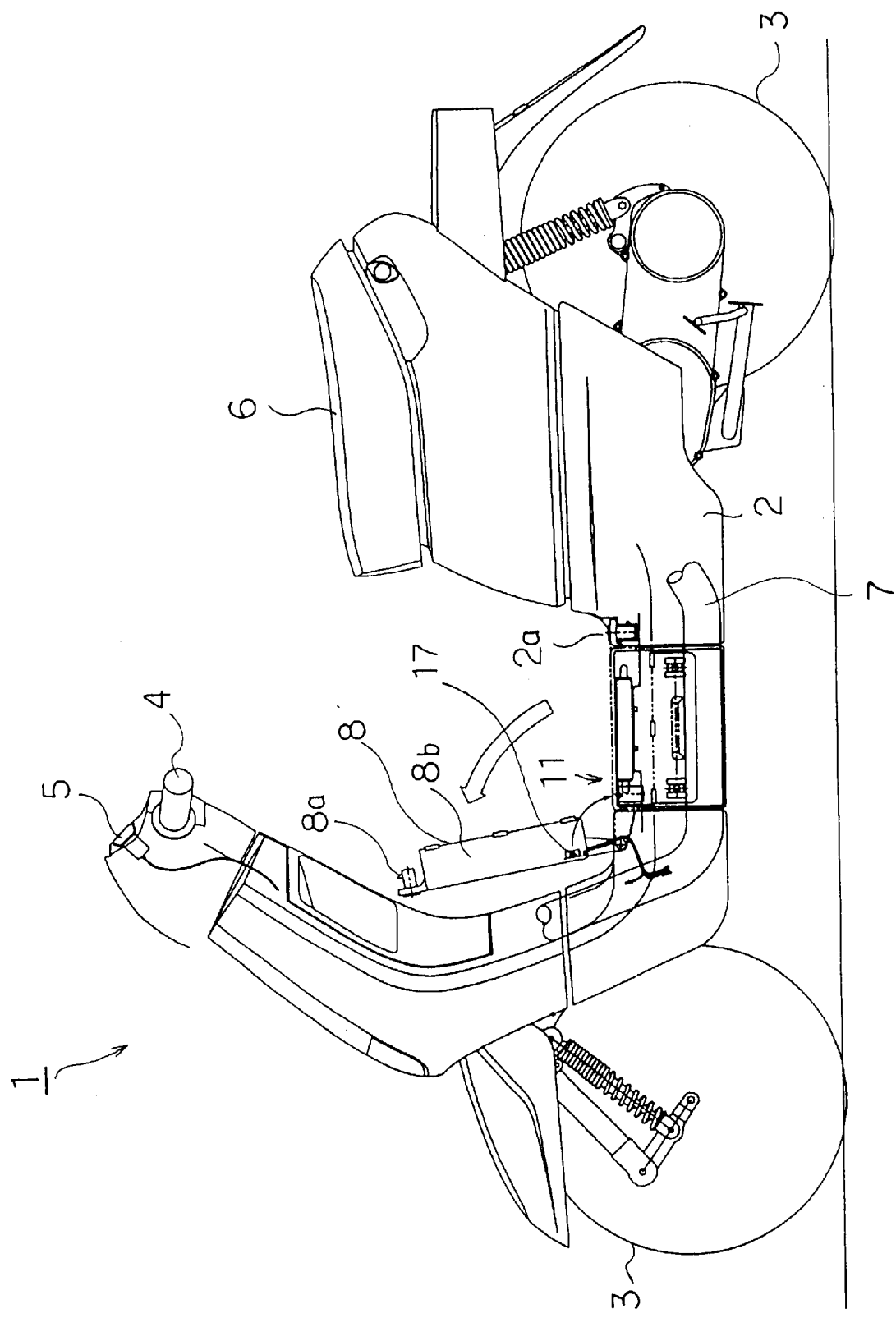
[FIG. 1] A side view of an electric scooter according to an embodiment of the present invention.
Figure 2:
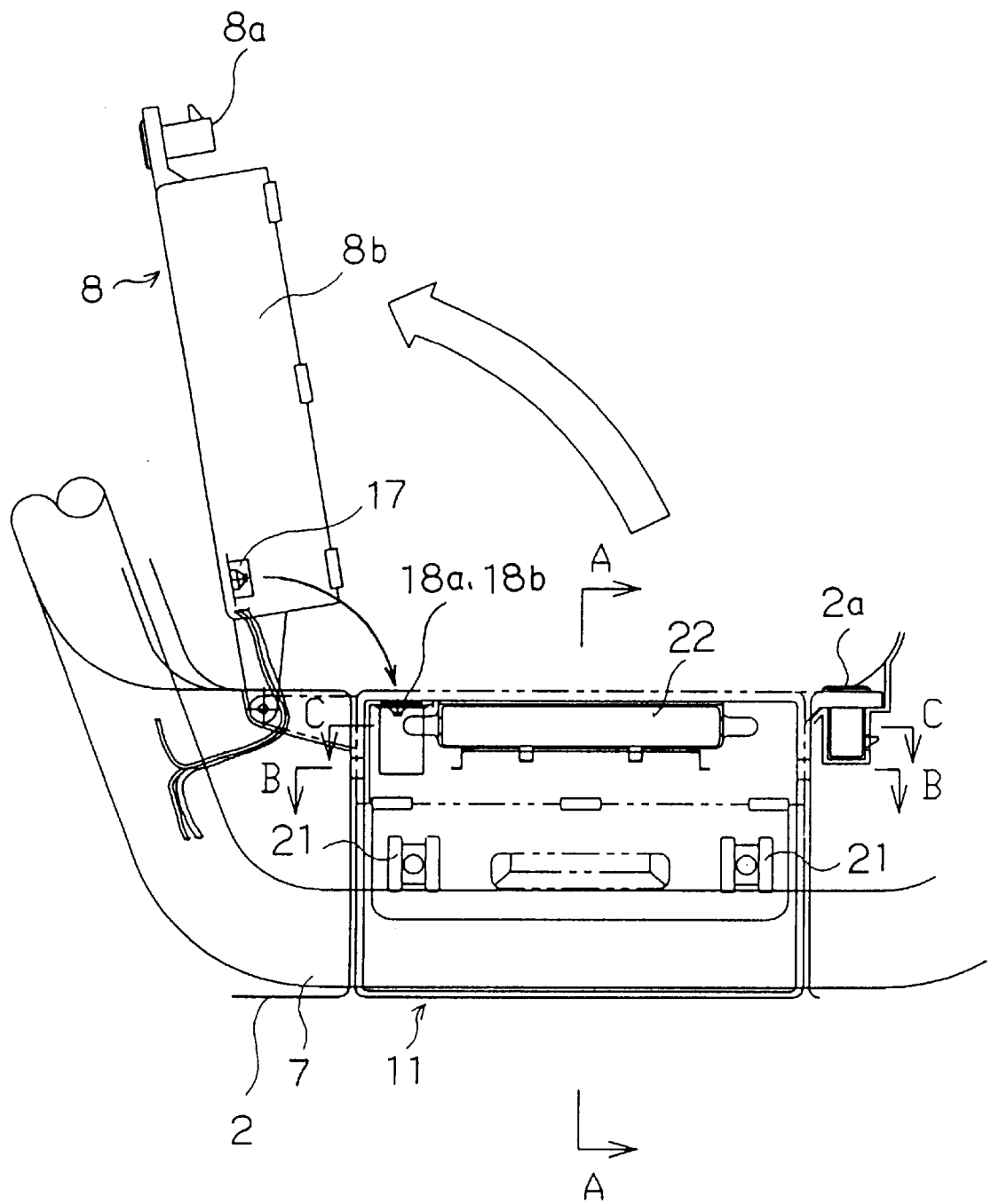
[FIG. 2] An enlarged view of a part of a battery power unit of FIG. 1.
Figure 3:
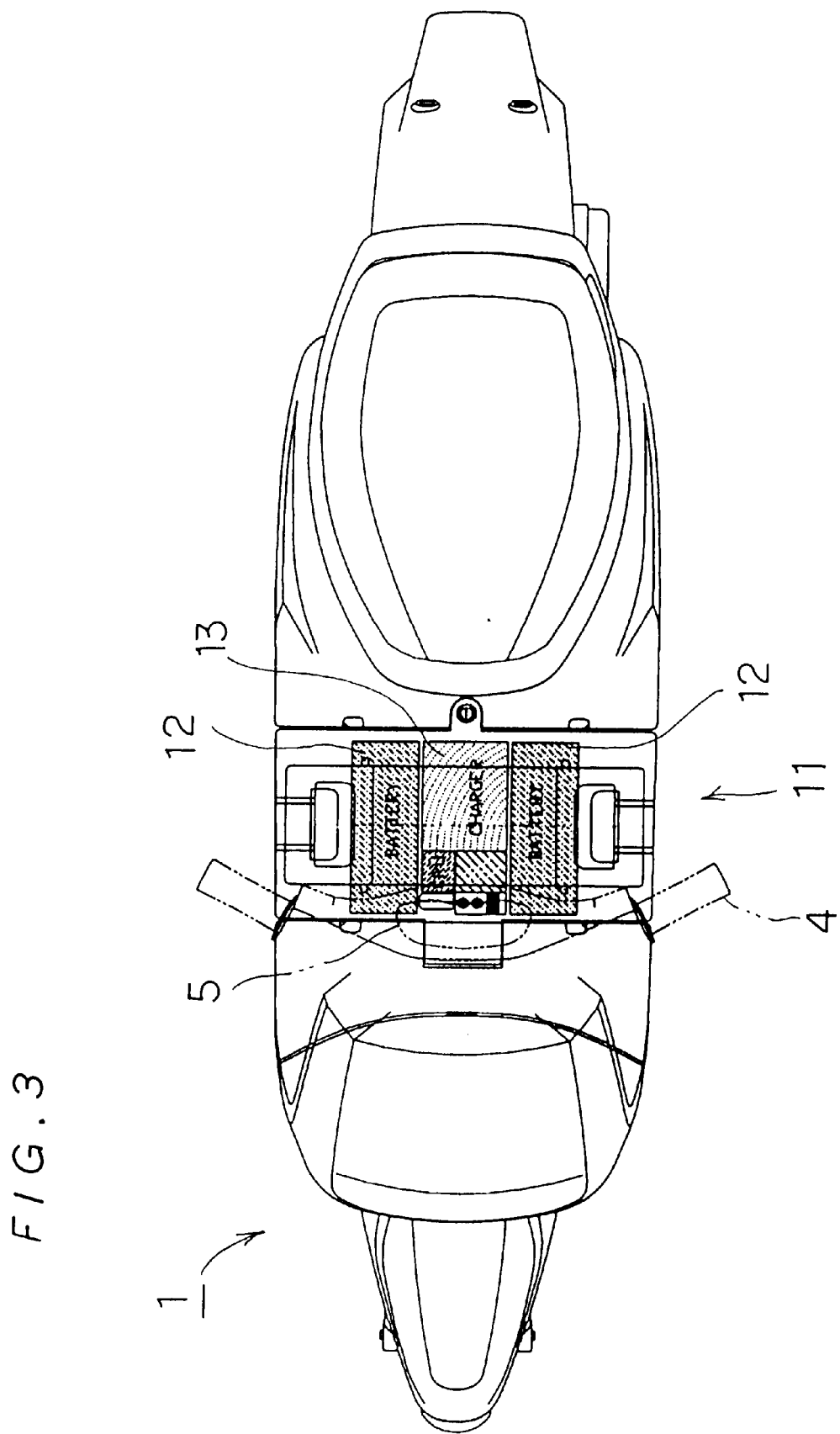
[FIG. 3] A top plan view of the scooter of FIG. 1.
Figure 4:
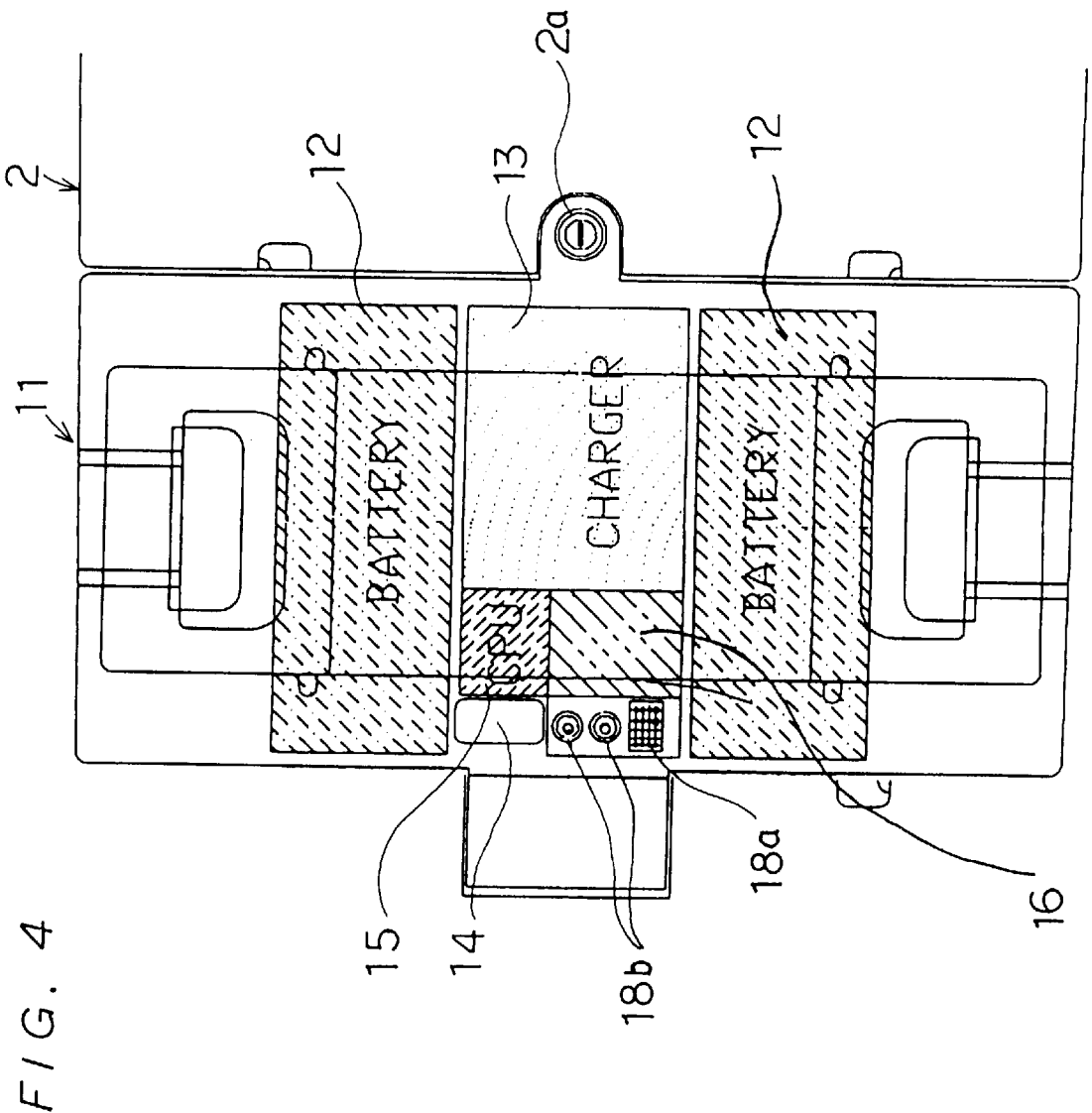
[FIG. 4] An enlarged view [showing] of a part of the battery power unit of FIG. 3.

FIG. 1 is a side elevation view of a scooter, an example of an electric motor cycle according to the present invention, FIG. 2 is an enlarged view of a portion of a battery power unit of FIG. 1, FIG. 3 is a plan view of the scooter, and FIG. 4 is an enlarged view of a portion of the battery power unit of FIG. 3.

In these drawings, a scooter 1 of this embodiment is an electric motor cycle which runs by driving a motor by batteries and has the same basic arrangement as an engine-driven scooter including basic elements, such as wheels 3, 3 arranged at the front and rear of a vehicle body 2, handles 4, a display 5 such as a speed meter indicator, and a saddle 6.

In the scooter 1 of this embodiment, a battery power unit 11 to be described in detail afterward is removably or detachably provided across a structure material 7 which is disposed in a longitudinal direction of the vehicle body 2, and the battery power unit 11 has its top covered with a cover (top cover 8).

The top cover 8 is pivotably fitted to the vehicle body 2 and forms the step of the scooter 1 when it covers the battery power unit 11. Thus, the number of members used can be saved since the top cover 8 of the battery power unit 11 also serves as the step. And, the vehicle can be light-weighted because the number of the members is reduced.

Besides, the scooter 1 of this embodiment has a plurality of batteries 12 forming the battery power unit 11 and a charger 13 integrated into one body, and the integrated body of the batteries 12 and the charger 13 is detachably mounted on the vehicle body 2.

Since the batteries 12 and the charger 13 are integrated into one body, the batteries 12 can be recharged without separately preparing a charger. The batteries 12 can be recharged readily when they are removed from the vehicle body 2 as well as when they are on the vehicle body 2 because the batteries 12 are provided with the charger 13.

In this embodiment, the battery power unit 11 is defined as the batteries 12 or the integrated body of the batteries 12 and the charger 13, however, the battery power unit may be an aggregate of at least batteries.

The batteries 12 and the charger 13 can also be further integrated with a remaining capacity meter 14 into one body, and the integrated body of the batteries 12, the charger 13 and the remaining capacity meter 14 can be removably mounted on the vehicle body 2.

Since the remaining capacity meter 14 is used to measure the remaining electric capacity of the batteries 12, electric wires are made short owing to the integration of the remaining capacity meter 14 with the batteries 12, thus saving the space and the devices.

The battery power unit of this kind is provided with a battery-monitoring CPU to protect the batteries and a charger-controlling CPU separately. In this embodiment, a single CPU 15 is used to serve as the battery-monitoring CPU to protect the batteries and also as the charger-controlling CPU.

Thus, the single CPU 15, instead of two, is used, enabling to save energy and to reduce costs. Reference numeral 16 is a controller disposed on the battery power unit 11.

In FIG. 1 through FIG. 4, a signal line from the remaining capacity meter 14 and a signal line disposed on the vehicle body 2 are connected via connectors 17, 18a and 18b, and a display of the remaining capacity meter 14 is also provided near the speed meter display (display 5).

By configuring as described above, the remaining capacity of the batteries 12 can be checked even while the vehicle is running to take measures before the batteries are dead, so that a dangerous situation that the batteries are dead while the vehicle is running can be prevented as much as possible.

In this embodiment, the connector 18a and the electric power connector 18b of the signal line of the battery power unit 11 are integrated into one body so to provide the connection of the connector 18a by connecting the electric power connector 18b. Similarly, the connector 17 provided on the top cover 8 also integrates the connector of the signal line with the electric power connector to provide the connection of the signal line connector by connecting the electric power connector.

By configuring as above, both the connectors can be connected by a single operation without separately connecting, so that it is convenient because the connecting time and effort can be decreased.

The top cover 8 and the vehicle body 2 are provided with locking keys 8a, 2a. These locking keys 8a, 2a securely join the top cover 8 with the battery power unit 11, particularly the aforesaid connectors, when the battery power unit 11 is covered with the top cover 8.

As shown in FIG. 3 and FIG. 4, the batteries 12, 12 of the battery power unit 11 are disposed on right- and left-hand sides of the charger 13 with respect to a direction of traveling. By disposing the charger 13 between the batteries 12 and 12, it is easy to recharge the neighboring batteries by the charger. And, it is desirable in view of a weight balance because the batteries 12, 12 which are relatively heavy are arranged on both sides of the scooter 1 with respect to its running direction.

Figure 5:
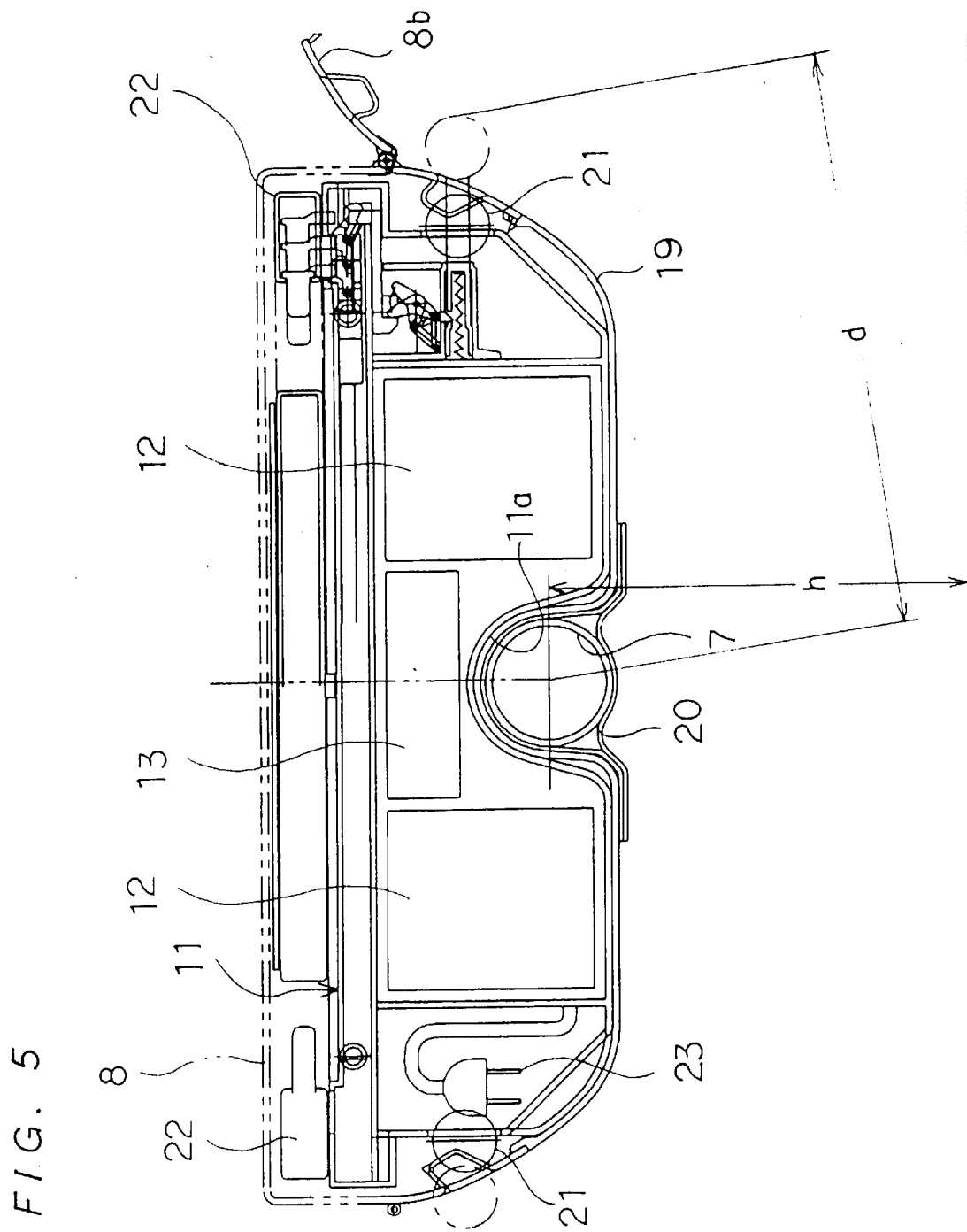
[FIG. 5] A sectional view of the battery power unit taken along line A—A of FIG. 2.
Figure 6:
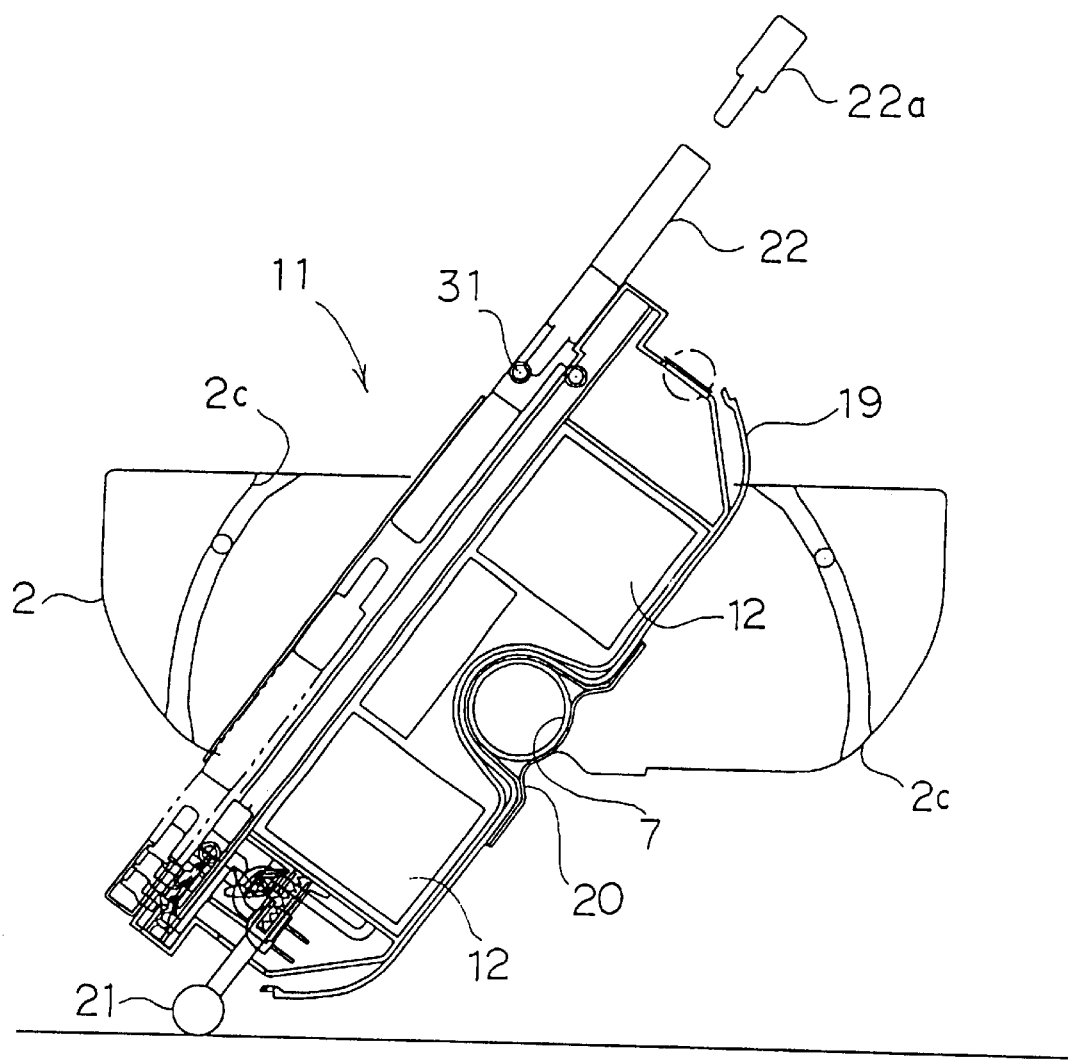
[FIG. 6] A sectional view of the battery power unit of FIG. 5 which is rotated counterclockwise.
Figure 7:
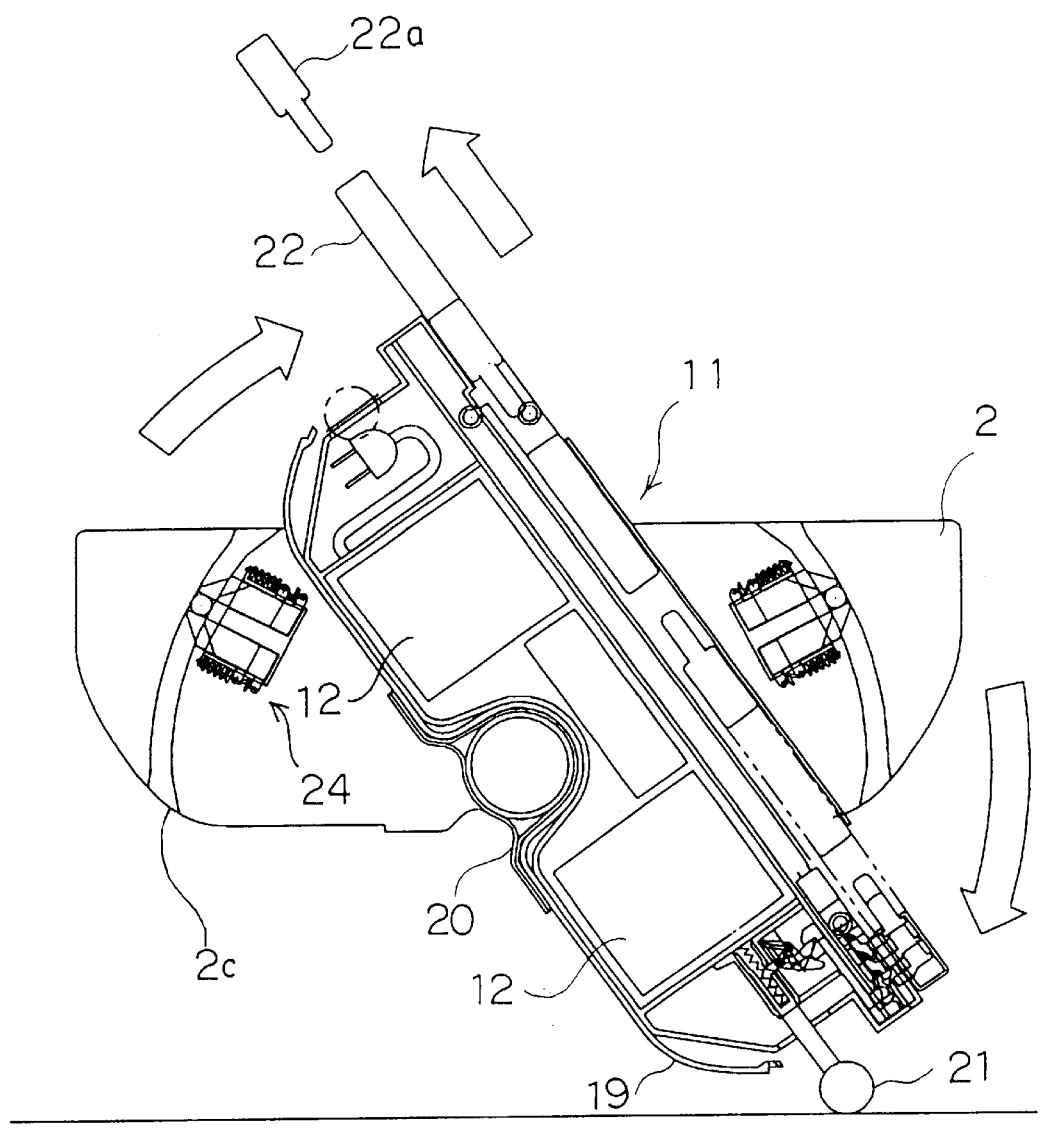
[FIG. 7] A sectional view of the battery power unit of FIG. 5 which is rotated clockwise.
Figure 8:
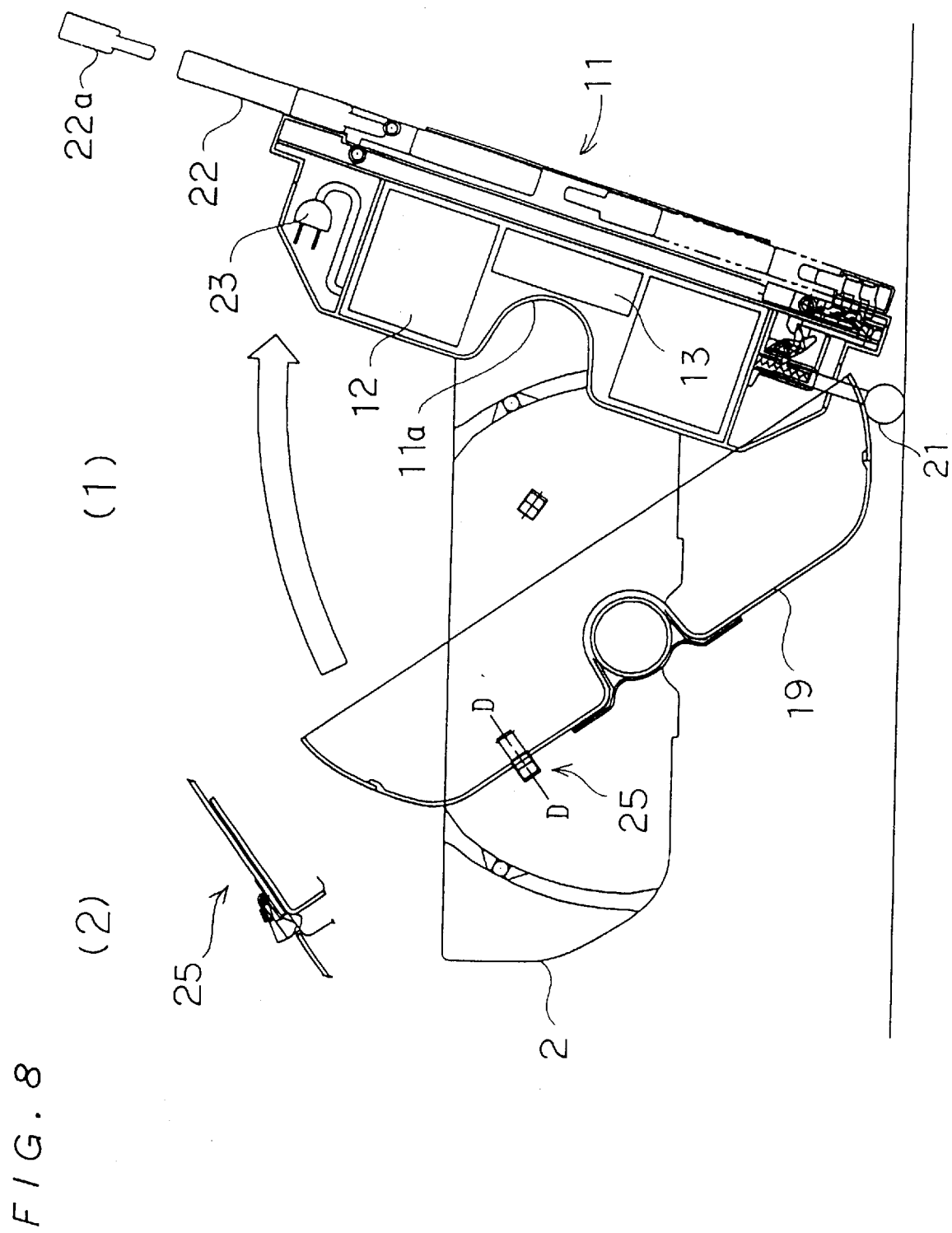
[FIG. 8] (1) A sectional view of the battery power unit of FIG. 5 which is rotated clockwise to be removed from the battery fixing member.
Figure 9:
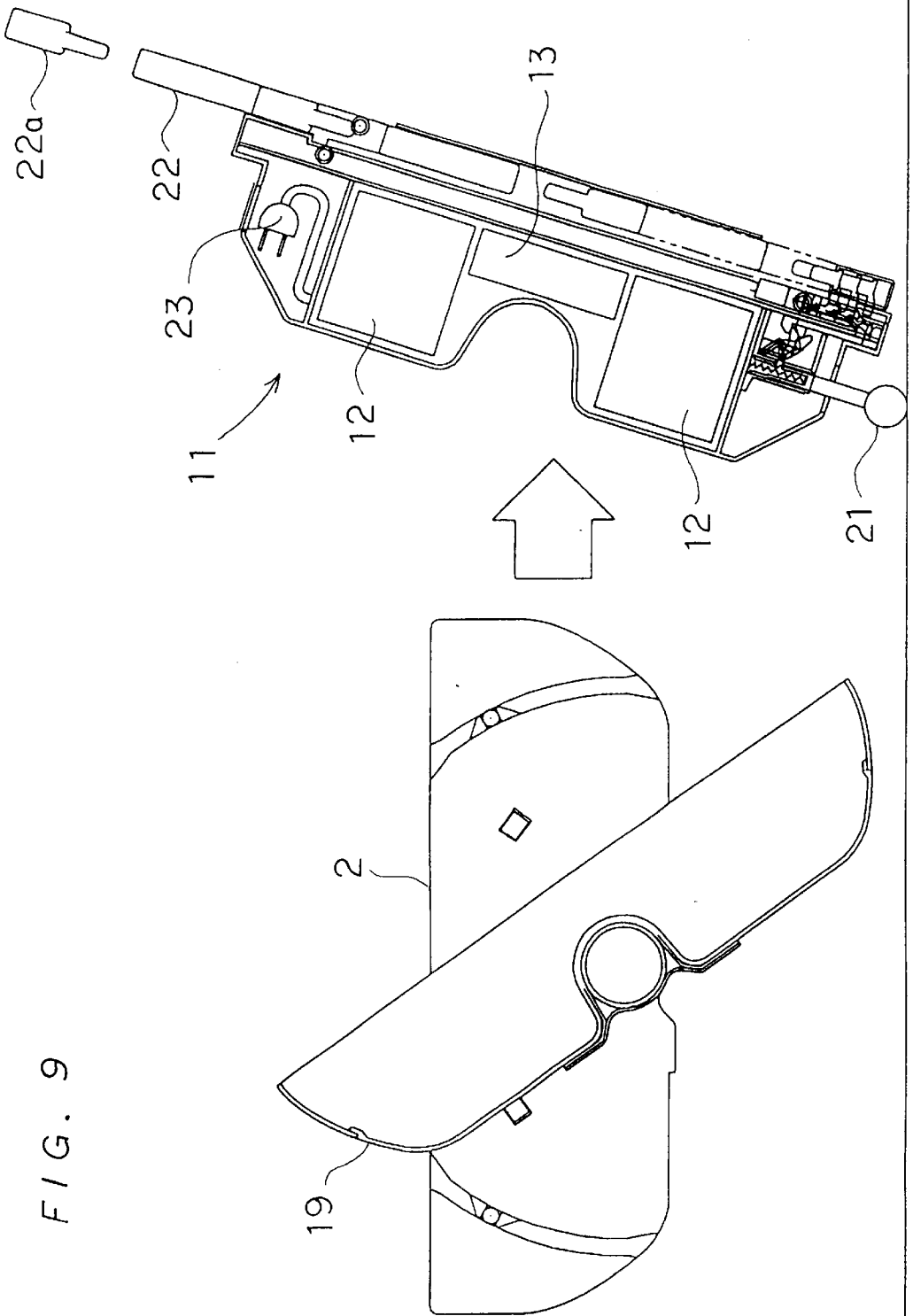
[FIG. 9] A sectional view of the battery power unit of FIG. 5 which is rotated clockwise and removed from the battery fixing member.

In FIG. 5 through FIG. 7, the battery power unit 11 is rotatably mounted on the structure material 7 of the vehicle body 2. Thus, the battery power unit 11 to be mounted or removed can be in a posture to have an appropriate rotation angle because the battery power unit 11 is rotatably mounted on the structure material 7. Therefore, the battery power unit 11 can be removed or mounted readily as shown in FIG. 8 and FIG. 9.

The battery power unit 11 of this embodiment has the cover (top cover 8) on its top, and the top cover 8 constitutes the step of the scooter. Besides, a battery fixing member 19 is rotatably mounted on the structure material 7, and the battery power unit 11 is attached to the battery fixing member 19, so that the battery power unit 11 is rotatably mounted on the structure member 7. Reference numeral 20 is a rotating member rotatably supported by the structure material 7. The battery fixing member 19 is attached to the rotating member 20, so that the battery fixing member 19 is rotatably mounted on the structure material 7.

Thus, the rotatable mounting of the battery fixing member 19 on the structure material 7 eliminates the necessity of having a rotating mechanism on the battery power unit 11 with respect to the structure material 7, so that the battery power unit 11 can be made to have a simplified structure. Thus, the battery power unit 11 to be removed from the vehicle can be light-weighted, and its transport and handling can be facilitated. The battery power unit 11 is rotatable by attaching to the battery fixing member 19, so that the posture of the battery power unit 11 can be made to have an appropriate rotating angle when it is removed or mounted as described above. Thus, the removal and mounting of the battery power unit can be facilitated.

The battery fixing member 19 also serves as a bottom cover of the battery power unit 11. Therefore, the battery power unit 11 is protected from mud, water and the like splashed by a tire, so that the batteries 12 can be avoided from being damaged by an external factor and prevented from being degraded and shortened in service life time.

As shown in FIG. 5, the battery fixing member 19 is mounted on the structure material 7, and the battery power unit 11 is mounted on the battery fixing member 19, so that a large recess 11a is formed at the center of the battery power unit 11, the charger 13 of a thin type is disposed in the recess 11a, thereby the batteries 12, 12 are arranged on both sides of the charger 13 as described above.

The structure material 7 is arranged near the center line of the vehicle body 2, and the battery power unit 11 rotatably mounted on the structure material 7 can be removed or mounted from either side of the vehicle body 2 (FIG. 6 and FIG. 7). Since the battery power unit 11 is detachable from either side of the vehicle body 2, it is very convenient to mount or remove it in a narrow place.

A distance d from the rotation center of the battery power unit 11 to the side of the battery power unit 11 is larger than a height h from the rotation center of the battery power unit 11 to the ground. Therefore, when the battery power unit 11 is rotated in either direction, the end of the battery power unit 11 is brought into contact with and supported by the ground because of d>h, so that the battery power unit 11 can be removed easily.

In this embodiment, a wheel 21 is provided on either side of the battery power unit 11. By means of the wheel 21 disposed on either side of the battery power unit 11, it is convenient to carry the battery power unit 11. Particularly, when the battery power unit 11 is rotated, the wheel 21 of the battery power unit 11 can be smoothly brought into contact with the ground. Accordingly, the battery power unit 11 can be carried more easily.

The wheel 21 is retractably mounted. Details of a retracting mechanism of the wheel 21 will be described afterward. By retractably mounting the wheel 21, the wheel 21 does not disturb the attachment of the battery power unit 11 to the vehicle body 2, and when the battery power unit 11 is removed from the vehicle body 2 to recharge the batteries 12, the wheel 21 is pulled out, so that the battery power unit 11 can be carried readily as described above.

In this embodiment, the battery power unit 11 is provided with a retractable handle 22. When removing the battery power unit 11 from the vehicle body 2, the handle 22 is pulled out so that the battery power unit 11 can be eaisily carried, and when the battery power unit 11 is mounted on the vehicle body 2, the handle 22 is housed so that it does not disturb the handling.

The handle 22 can be pulled out from any side of the battery power unit 11 so to be usable from any side of the battery power unit 11. Thus, the handle 22 is pulled out from either side as required depending on the side from which the battery power unit 11 is removed, so that the battery power unit 11 is conveniently carried as described above. Reference numeral 23 is an AC plug used for recharging.

Besides, the battery power unit 11 is provided with a locking mechanism for operating to engage with or disengage from the vehicle body 2 as the handle 22 is retracted or pulled out. Details of the locking mechanism will be described afterward.

Thus, since the battery power unit 11 is provided with the locking mechanism with respect to the vehicle body 2, it can be fixed to the vehicle body 2 while the vehicle is running, and an accidental separation of the removable battery power unit 11 can be prevented. And, it is convenient that the locking mechanism simply engages or disengaged when the handle 22 is retracted or pulled out.

As shown in detail in FIG. 1 and FIG. 5, the top cover 8 is pivotally opened in the running direction of the vehicle body 2 and also provided with a lid 8b on both sides thereof, which is pivotally opened in a right-and-left direction. The lid 8b is located at a position corresponding to a position of the wheel 21 of the battery power unit 11 and its edge is engageable with the end of the battery fixing member 19.

Now, the locking mechanism provided on the battery power unit 11 and the retractable mechanism of the wheel 21 will be described.

Figure 10:
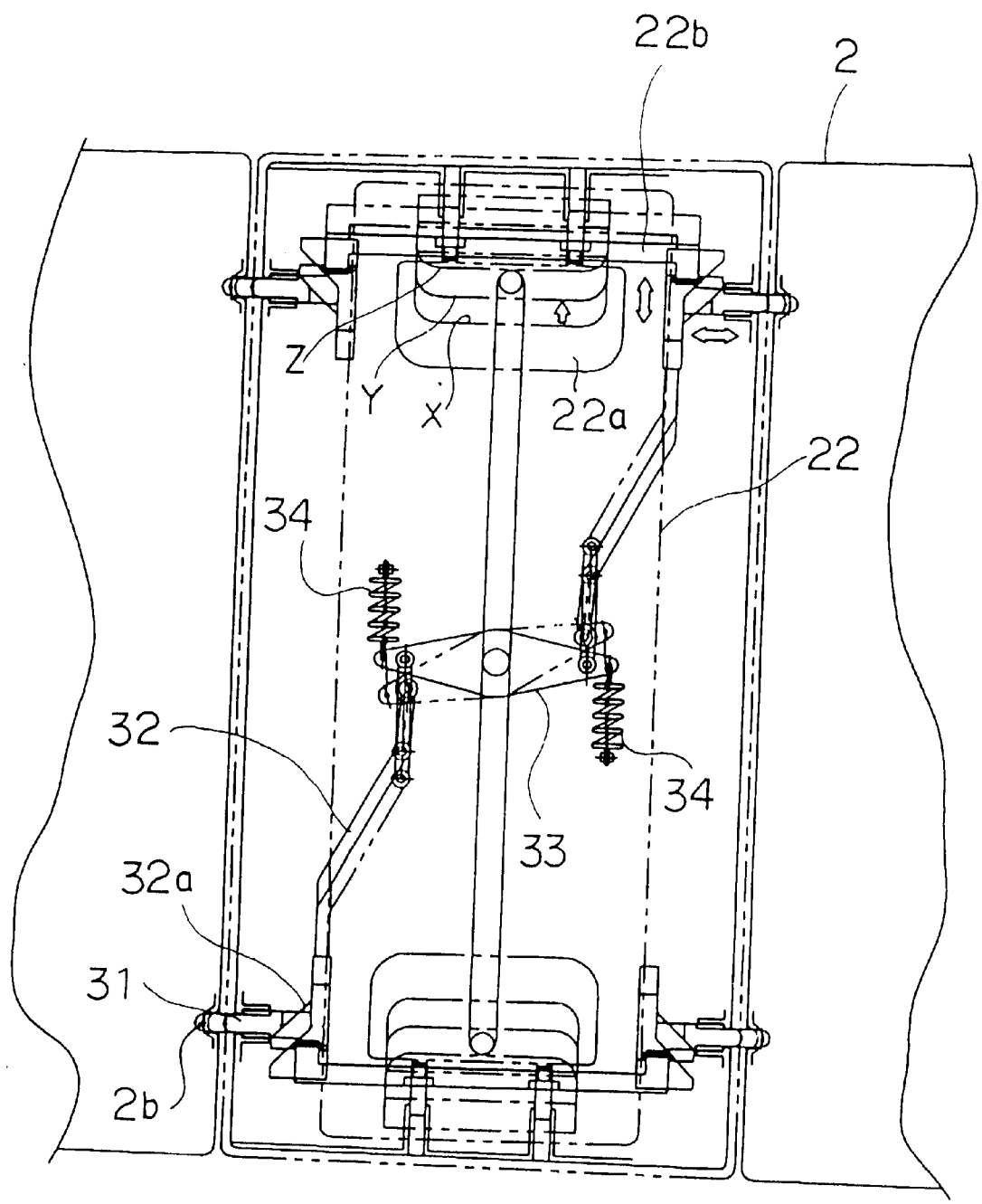
[FIG. 10] A top plan view of the battery power unit taken along line B—B of FIG. 2.
Figure 11:
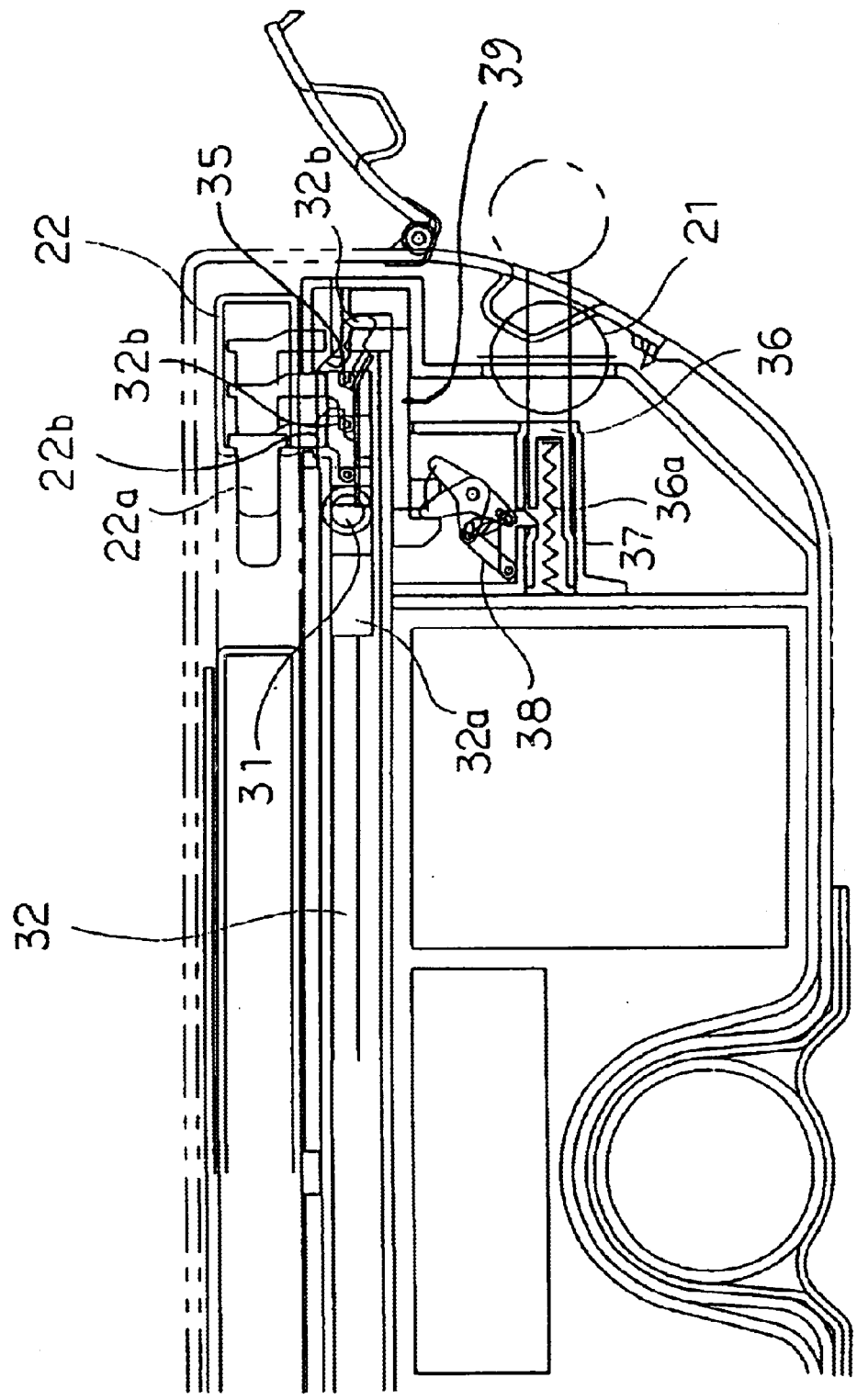
[FIG. 11] An enlarged view of a wheel and its periphery of FIG. 5.

FIG. 10 is a plan view taken along line B—B of FIG. 2, and FIG. 11 is an enlarged diagram showing the wheel and its periphery in FIG. 5. In these drawings, the battery power unit 11 is fixed to the vehicle body 2 by four locking pins 31, 31. Each of the locking pins 31 is regularly biased elastically toward the battery power unit 11 by an unillustrated coil spring.

The handle 22 of the battery power unit 11 is provided with a link member 32 which pushes the locking pin 31 toward the vehicle body 2 by a tapered portion 32a provided at the forward end thereof. The link member 32 has a hook-shape member 32b pivotally mounted at its forward end, which is engageable with an end of a member 22b having a U-shape when viewed from the top that is linked with a grip 22a of the handle 22. And, the link member 32 has its base pivotally connected to the end of a pivotally supporting member 33. The supporting member 33 is pivotally biased by a spring 34 in a clockwise direction in FIG. 10.

Therefore, the link member 32 is pulled in a direction of the supporting member 33 when the grip 22a of the handle 22 is in the initial position X, and the locking pin 31 is pushed toward the vehicle body 2 by the tapered portion 32a. Thus, the locking pin 31 is protruded against the force of the unillustrated coil spring. The forward end of the locking pin 31 is engaged with a pin receiver 2b of the vehicle body 2, and the battery power unit 11 is locked on the vehicle body 2.

Besides, the grip 22a of the handle 22 not only stays at the initial position X but also is slidable to a first moved position Y and a second moved position Z before the handle 22 is pulled out.

When the grip 22a is slid to the second moved position Z, the end of the U-shaped member 22b is positioned where a taper member 35 is disposed nearby.

When the grip 22a is held and slid from the initial position X to the first moved position Y, the member 22b linked to the grip 22a is also slid, the hook-shape member 32b engaged with the member 22b is pulled, the link member 32 is also slid against the spring 34, and the pushing to the locking pin 31 by the tapered portion 32a of the link member 32 is released. Therefore, the locking pin 31 is buried into the battery power unit 11 as it is biased by the unillustrated coil spring, its engagement with the pin receiver 2b of the vehicle body 2 is released, and the battery power unit 11 is made free with respect to the vehicle body 2, namely the battery power unit 11 is in a rotatable state with respect to the vehicle body 2.

Besides, when the grip 22a is held and slid from the first moved position Y to the second moved position Z, the member 22b linked with the grip 22a is also slid, and the hook-shape member 32b engaged with the member 22b is pulled in the same way as described above. The second moved position Z of the grip 22a is the final slid position of the grip, so that further pulling of the grip results in pulling out the handle 22 from the battery power unit 11. When the handle 22 is pulled out, and the battery power unit 11 is pivoted, the side of the battery power unit 11 is brought into contact with the ground, as described above.

When the grip 22a is in the second moved position Z, the hook-shape member 32b comes in pressure contact with the taper member 35, and the hook-shape member 32b restricted by the pressure contact is pivoted to separate from the end of the member 22b. When the hook-shape member 32a is separated from the end of the member 22b, the link member 32 pulled toward the supporting member 33 is returned to the original position and pushes again the locking pin 31 toward the vehicle body 2 by its tapered portion 32a, and the locking pin 31 is protruded against the force of the unillustrated coil spring.

When the locking pin 31 is protruded in the above state, it is held by a pin holding mechanism 24 (FIG. 7) disposed in a guide groove 2c of the vehicle body 2 when the battery power unit 11 is housed in the vehicle body 2. Thus, the battery power unit 11 can be kept in a horizontal state readily when it is housed in the vehicle body 2.

As shown in FIG. 8(2), a retaining device 25 is provided to keep the posture of the battery power unit 11 when the battery power unit 11 is pivoted with its side brought into contact with the ground.

FIG. 11 shows that the retracting mechanism of the wheel 21 is configured as follows. A cylindrical member 36 having the wheel 21 disposed on its end is disposed to be retractable in a cylindrical holding member 37 which is larger than the member 36. The cylindrical member 36 has a coil spring 36a therein to regularly bias the member 36 and the wheel 21 externally.

The cylindrical member 36 and the holding member 37 are formed with notches at corresponding positions, and a link mechanism 38 is disposed near the notches to have its end engaged with the notches. Besides, the link mechanism 38 is engaged with one end of a link member 39 which is slidably mounted. And, the link member 39 is also disposed to have its other end engaged with the hook-shape member 32a.

Therefore, when the end of the link mechanism 38 is engaged with the notches of the cylindrical member 36 and the holding member 37 to keep the wheel 21 in the retracted state, the operation of moving the grip 22a to the second moved position Z causes the hook-shape member 32b to come in pressure contact with the link member 39 so to slide the link member 39. And, the slide of the link member 39 makes the link mechanism 38 pivot so to release the end of the link mechanism 38 from the notches, and the wheel 21 is biased to protrude by elasticity of the coil spring 36a.

Figure 12:
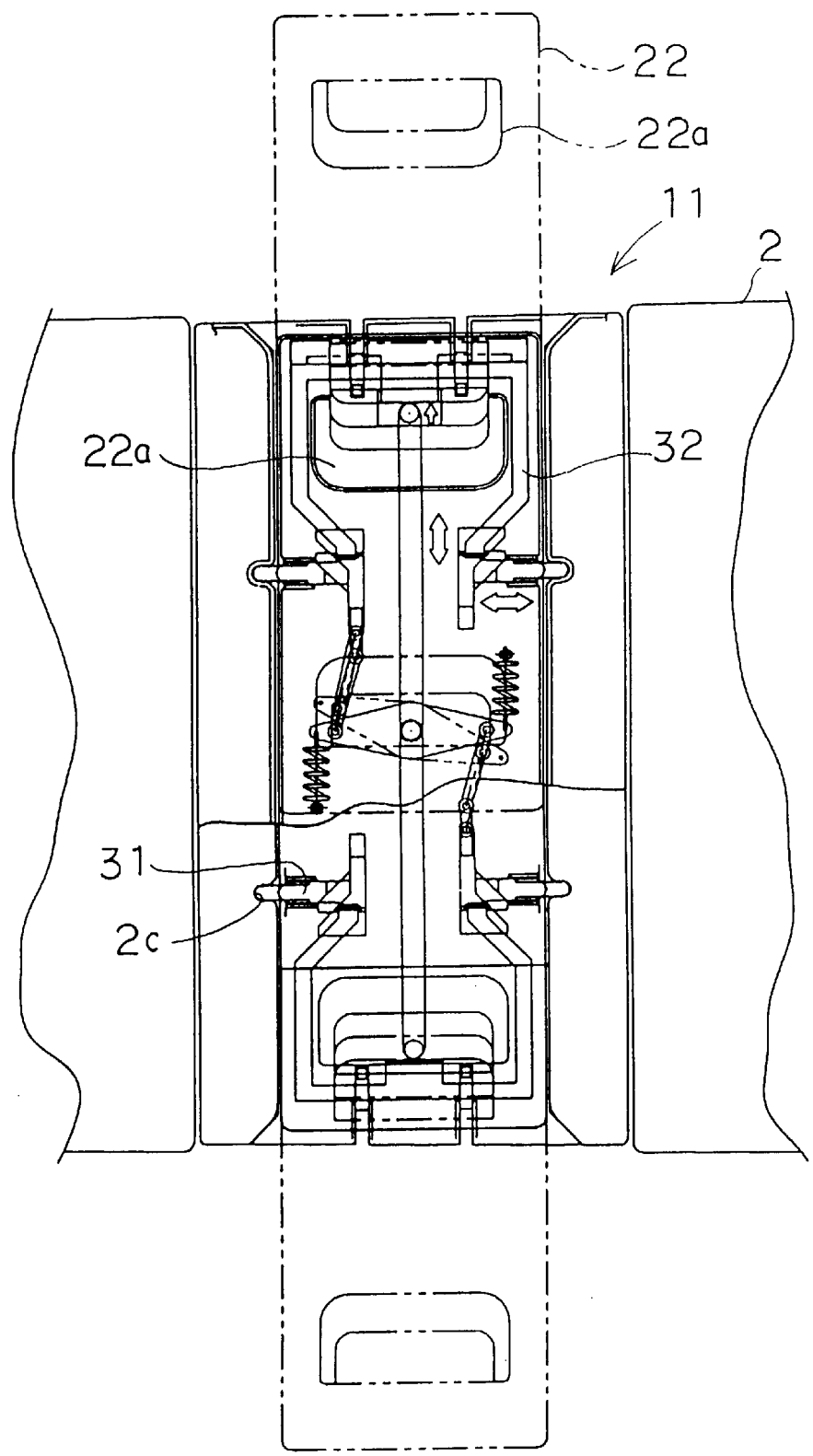
[FIG. 12] A top plan view of the battery power unit seen along line C—C of FIG. 2.

FIG. 12 is a plan view taken along line C—C of FIG. 2, showing a locking mechanism for locking the handle 22 and the battery power unit 11. This locking mechanism has basically the same structure as the locking mechanism for the battery power unit 11 and the vehicle body 2. Therefore, the same reference numerals are used to indicate the same or similar components, and their detailed descriptions will be omitted.

It is to be understood that the above embodiments are only examples of the invention and the invention is not limited thereto, and modifications to the embodiments may be possible.

INDUSTRIAL APPLICABILITY

The invention is a battery-mounted electric motor cycle, wherein batteries and a charger are integrated into one body, and the integrated body of batteries and charger is removably mounted on the vehicle body.

Accordingly, the invention is applicable to various electric motor cycle with two wheels and four wheels.

What is claimed is:

1. An electric motor cycle, comprising:
   a vehicle body;
   a structure material arranged at a lower portion of said vehicle body; and
   a removable battery power unit mounted on and straddling over said structure material such that said battery power unit is substantially equally balanced on left and right sides of said structure material and including at least one battery, a charger, a remaining capacitor meter, a controller, connectors, a CPU, and a pair of wheels pulled out from and retracted into said battery power unit, wherein at least said at least one battery and charger are integrally formed and said pair of wheels are provided one for each of left and right sides of said battery power unit such that a distance between an outer circumstance of said retractable wheels in a pulled-out position and a center of said structure material is greater than a distance between said center of said structure material and the ground so that said battery power unit is removable from any side of left and right sides of said vehicle body.

2. The electric motor cycle according to claim 1, wherein said at least one battery comprises a pair of batteries, said pair of batteries being provided one for each of left and right sides of said structure material and said remaining capacity meter, controller, connectors, and CPU are provided between said pair of batteries.

3. The electric motor cycle according to claim 1, wherein said CPU is made such that it monitors said battery and controls said charger.

4. The electric motor cycle according to claim 1, wherein said battery power unit has a drawable handle which is drawable from any side of said battery power unit and has grips on both ends thereof so that said battery power unit is locked to and unlocked from said vehicle body by sliding movement of one of said grips.

5. The electric motor cycle according to claim 4, wherein said drawable handle has a pair of link members for engaging and disengaging a plurality of lock pins provided on said battery power unit with and from said vehicle body by said sliding movement of one of said grips.

6. The electric motor cycle according to claim 5, wherein each of said link members has a hook-shaped member pivotablly provided at a front end thereof which engages with and disengages from a U-shaped member provided on said drawable handle by said sliding movement of one of said grips.

* * * * *